US007006892B2

(12) United States Patent
Jeong

(10) Patent No.: US 7,006,892 B2
(45) Date of Patent: Feb. 28, 2006

(54) DISPENSER AND CONTROL METHOD THEREOF, AND REFRIGERATOR USING THE SAME

(75) Inventor: Seong-wook Jeong, Kwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 48 days.

(21) Appl. No.: 10/701,503

(22) Filed: Nov. 6, 2003

(65) Prior Publication Data

US 2004/0111182 A1 Jun. 10, 2004

(30) Foreign Application Priority Data

Dec. 9, 2002 (KR) ...................... 10-2002-0077761
Jan. 7, 2003 (KR) ...................... 10-2003-0000849

(51) Int. Cl.
*G06F 17/00* (2006.01)
*B65D 47/00* (2006.01)
*B67D 3/00* (2006.01)
*B67D 5/06* (2006.01)
*F25D 17/04* (2006.01)

(52) U.S. Cl. ...................... 700/231; 700/240; 222/556; 222/564; 62/187

(58) Field of Classification Search ................ 700/231, 700/240; 222/547, 556, 564; 62/187, 137, 62/408
See application file for complete search history.

(56) References Cited

U.S. PATENT DOCUMENTS 5,139,183 A * 8/1992 Buchser et al. ............. 222/547
5,737,932 A 4/1998 Lee
6,301,908 B1 * 10/2001 Huffman et al. .............. 62/137
6,381,975 B1 5/2002 Tsuchikawa
6,802,186 B1 * 10/2004 Holmes et al. ............... 62/187

FOREIGN PATENT DOCUMENTS

KR 2000-18759 4/2000
KR 2000-28309 5/2000
KR 10-0270872 8/2000
KR 20-0212608 11/2000
KR 2001-51251 6/2001
KR 10-358581 10/2002

* cited by examiner

*Primary Examiner*—Gene O. Crawford
(74) *Attorney, Agent, or Firm*—Staas & Halsey LLP

(57) ABSTRACT

A dispenser and a control method thereof, and a refrigerator using the same. A method of controlling a dispenser having a driving part discharging objects, and a switching part controlling the driving part to operate and stop, including sensing whether the switching part is turned on or off; and controlling the driving part to operate after a lapse of a predetermined delay time since the switching part is turned on.

23 Claims, 6 Drawing Sheets

DISPENSER AND CONTROL METHOD THEREOF, AND REFRIGERATOR USING THE SAME

CROSS-REFERENCE TO RELATED APPLICATIONS

This application claims the benefit of Korean Patent Application No. 2003-849, filed Jan. 7, 2003, and Korean Patent Application No. 2002-77761, filed Dec. 9, 2002 in the Korean Intellectual Property Office, the disclosures of which are incorporated herein by reference.

BACKGROUND OF THE INVENTION

1. Field of the Invention

The present invention relates to a dispenser and a control method thereof, and a refrigerator using the same, and, more particularly, to a dispenser and a control method thereof, and a refrigerator using the same, which can smoothly discharge objects.

2. Description of the Related Art

Generally, a device that automatically discharges objects such as a beverage, ice, etc., is called a dispenser. Recently, the dispenser has become widely used in refrigerators. FIG. 1 is a perspective view of a refrigerator with a dispenser. As shown therein, the refrigerator comprises a main cabinet 1 partitioned into a refrigerating compartment and a freezing compartment, having front openings, and a refrigerating compartment door 2 and a freezing compartment door 3 opening/closing the respective front openings of the refrigerating and freezing compartments. The freezing compartment door 3 is provided with the dispenser, including a discharging lever 4 to be operated for taking out ice made inside the freezing compartment.

FIG. 2 is a control block diagram of a conventional dispenser. As shown therein, the dispenser comprises a motor 130 employed in discharging the ice, a switching part 120 to be turned on/off by the discharging lever 4, and a controller 110 to control the motor 130 to operate or stop according to the on or off state of the switching part 120.

Further, the dispenser includes a discharging shutter (not shown), provided in the freezing compartment door 3, to expose and cover a discharging hole (not shown) through which the ice is discharged, wherein the discharging shutter is opened by the rotation of the discharging lever 4. Opening of the discharging shutter is physically interlocked with the rotation of the discharging lever 4, and closing of the discharging shutter is electrically controlled by the controller 110. The controller 110 controls a valve relay 116, and thus operates a solenoid valve 140, thereby making the discharging shutter cover the discharging hole once five seconds have passed since the switching part 120 is turned off.

In the conventional dispenser, the rotation of the discharging lever 4 causes both the switching part 120, for operating the motor 130, and the discharging shutter to be simultaneously turned on and opened, respectively. However, it is possible that the switching part 120 may not be turned on as the discharging lever 4 is rotated, even though the discharging shutter is opened. In this case, the controller 110 cannot operate the solenoid valve 140 because no indication of the subsequent off state of the switching part 120 is sent to the controller 10. Therefore, the discharging shutter does not cover the discharging hole, which allows frost to be deposited around the discharging hole.

Conversely, it is possible that the discharging shutter is not completely opened though the switching part 120 is turned on as the discharging lever 4 is rotated. In this case, the controller 110 senses the on state of the switching part 120 and controls the motor 130 to push the ice toward the discharging hole, but the ice is blocked by the discharging shutter, thereby allowing frost to be deposited around the discharging hole.

SUMMARY OF THE INVENTION

Accordingly, it is an aspect of the present invention to provide a dispenser and a control method thereof, and a refrigerator using the same, which can prevent discharging objects from being stuck in a discharging hole, and prevent frost from being deposited around the discharging hole, so as to smoothly discharge the discharging objects.

Additional aspects and/or advantages of the invention will be set forth in part in the description which follows and, in part, will be obvious form the description, or may be learned by practice of the invention.

The foregoing and other aspects of the present invention are achieved by providing a method of controlling a dispenser having a driving part employed in discharging objects, and a switching part controlling the driving part to operate and stop, comprising sensing whether the switching part is turned on or off; and controlling the driving part to operate after a lapse of a predetermined delay time since the switching part is turned on.

According to an aspect of the invention, the method may further comprise controlling the driving part to stop as soon as the switching part is turned off.

According to an aspect of the invention, the method may further comprise opening a discharging hole when the switching part is turned on, and closing the discharging hole after a lapse of a predetermined operating time since the switching part is turned off.

According to an aspect of the invention, the method may further comprise controlling the driving part to operate as soon as the switching part is turned on again before a predetermined restart time passes since the switching part is turned off.

According to an aspect of the invention, the predetermined restart time may be shorter than the predetermined operating time.

According to another aspect of the invention, the above and/or other aspects may be also achieved by providing a dispenser to discharge objects, comprising a driving part discharging the objects; a switching part; and a controller controlling the driving part to operate after a lapse of a predetermined delay time since the switching part is turned on, and stopping the driving part in response to the switching part being turned off.

According to an aspect of the invention, the controller may control the driving part to stop as soon as the switching part is turned off.

According to an aspect of the invention, the dispenser may further comprise a discharging lever turning the switching part on/off; a discharging hole through which the objects are discharged; a discharging shutter opening the discharging hole, wherein the opening of the discharging shutter is coupled with the discharging lever turning on the switching part; and a solenoid valve releasing the discharging shutter from an opened state so as to make the discharging shutter cover the discharging hole.

According to an aspect of the invention, the controller may control the driving part to operate as soon as the switching part is turned on again before a predetermined restart time passes since the switching part is turned off.

According to an aspect of the invention, the controller may control the solenoid valve to release the discharging shutter from the opened state after a lapse of a predetermined operating time since the switching part is turned off.

According to an aspect of the invention, the predetermined restart time may be shorter than the predetermined operating time.

BRIEF DESCRIPTION OF THE DRAWINGS

These and/or other aspects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Figure 1:
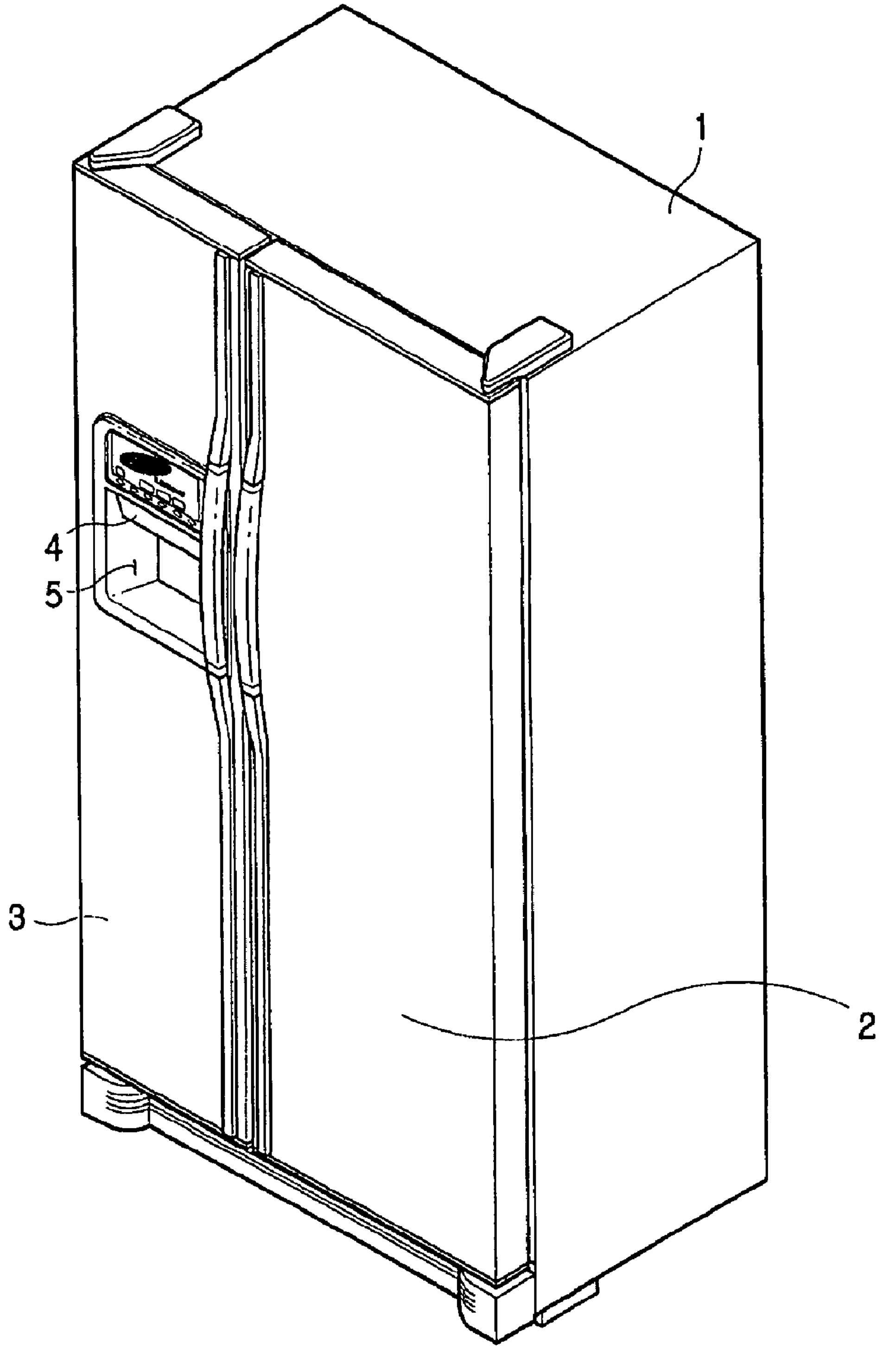
FIG. 1 is a perspective view of a refrigerator.
Figure 2:
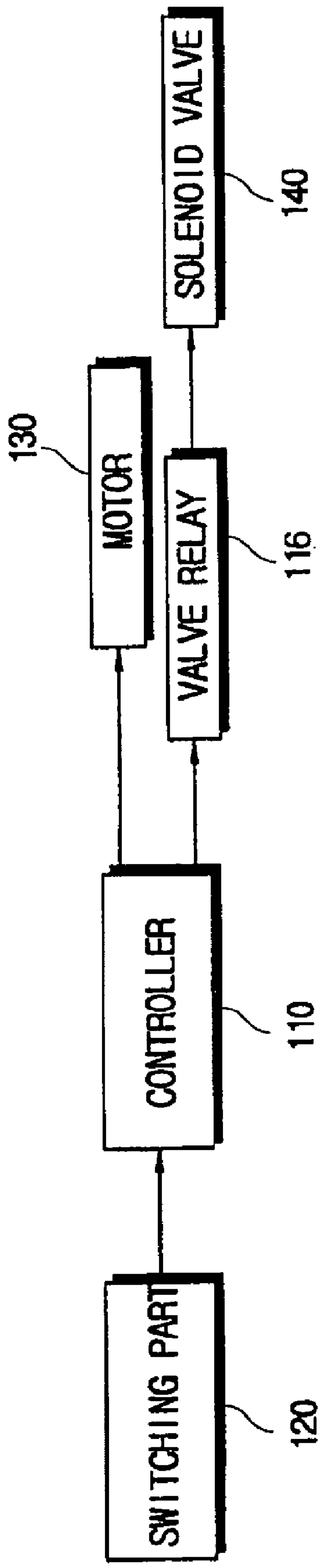
FIG. 2 (PRIOR ART)
FIG. 2 is a control block diagram of a conventional dispenser.

Reference will now be made in detail to some preferred embodiments of the present invention, examples of which are illustrated in the accompanying drawings, wherein like reference numerals refer to like elements throughout. The embodiments are described below in order to explain the present invention by referring to the figures. Here, general configurations of a refrigerator according to the present invention will be described with reference to FIG. 1.

As show in FIG. 1, a refrigerator according to an embodiment of the present invention comprises a main cabinet 1 partitioned into a refrigerating compartment and a freezing compartment, having front openings, and a refrigerating compartment door 2 and a freezing compartment door 3 respectively opening/closing the respective front openings of the refrigerating and freezing compartments. The freezing compartment door 3 is provided with a dispenser, including a discharging lever 4 to be operated for taking out ice made inside the freezing compartment.

In the front of the freezing compartment 3 is formed a dispensing part 5, which is recessed to accommodate a container to receive discharged objects such as ice. The discharging lever 4 is rotated forward and backward inside the dispensing part 5.

Figure 3:
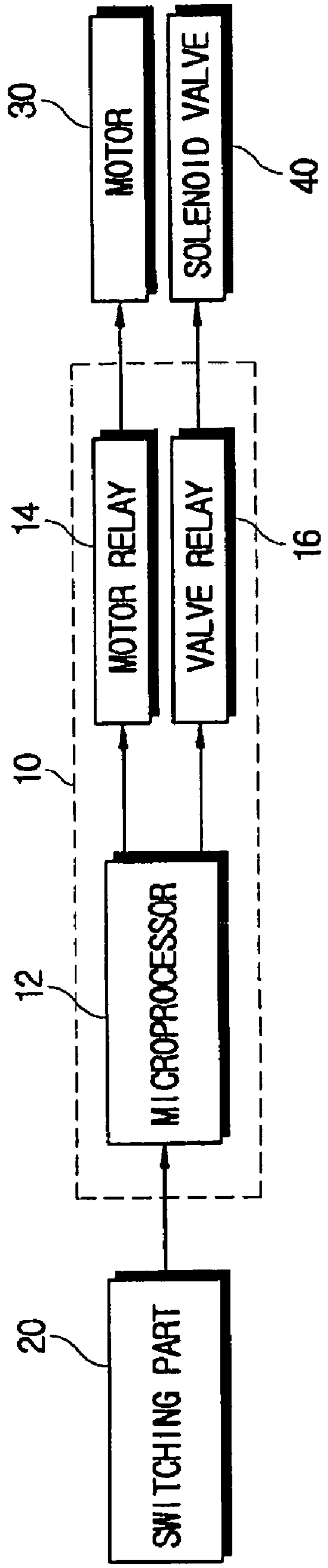
FIG. 3 is a control block diagram of a dispenser according to an embodiment of the present invention.
Figure 4:
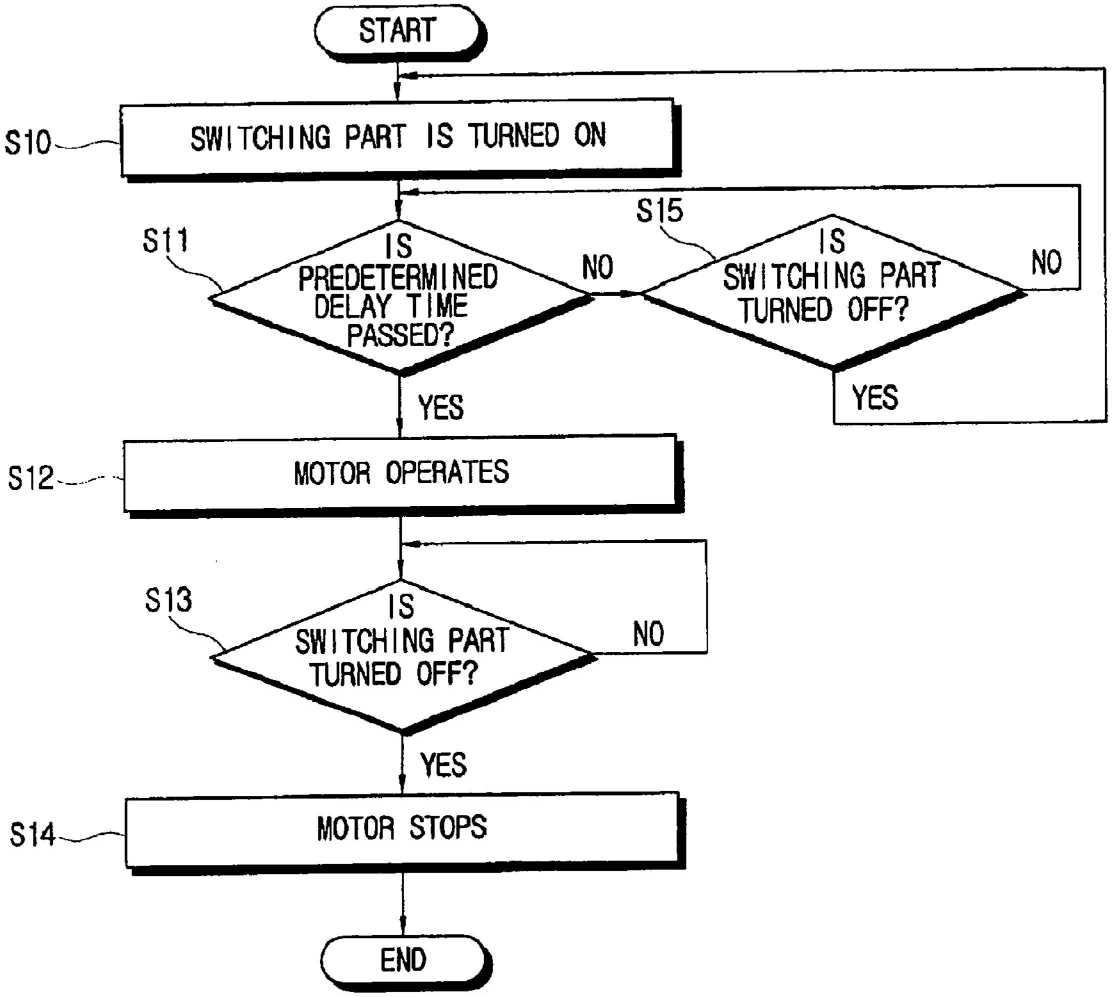
FIG. 4 is a control flowchart of the dispenser according to an embodiment of the present invention.
Figure 5:
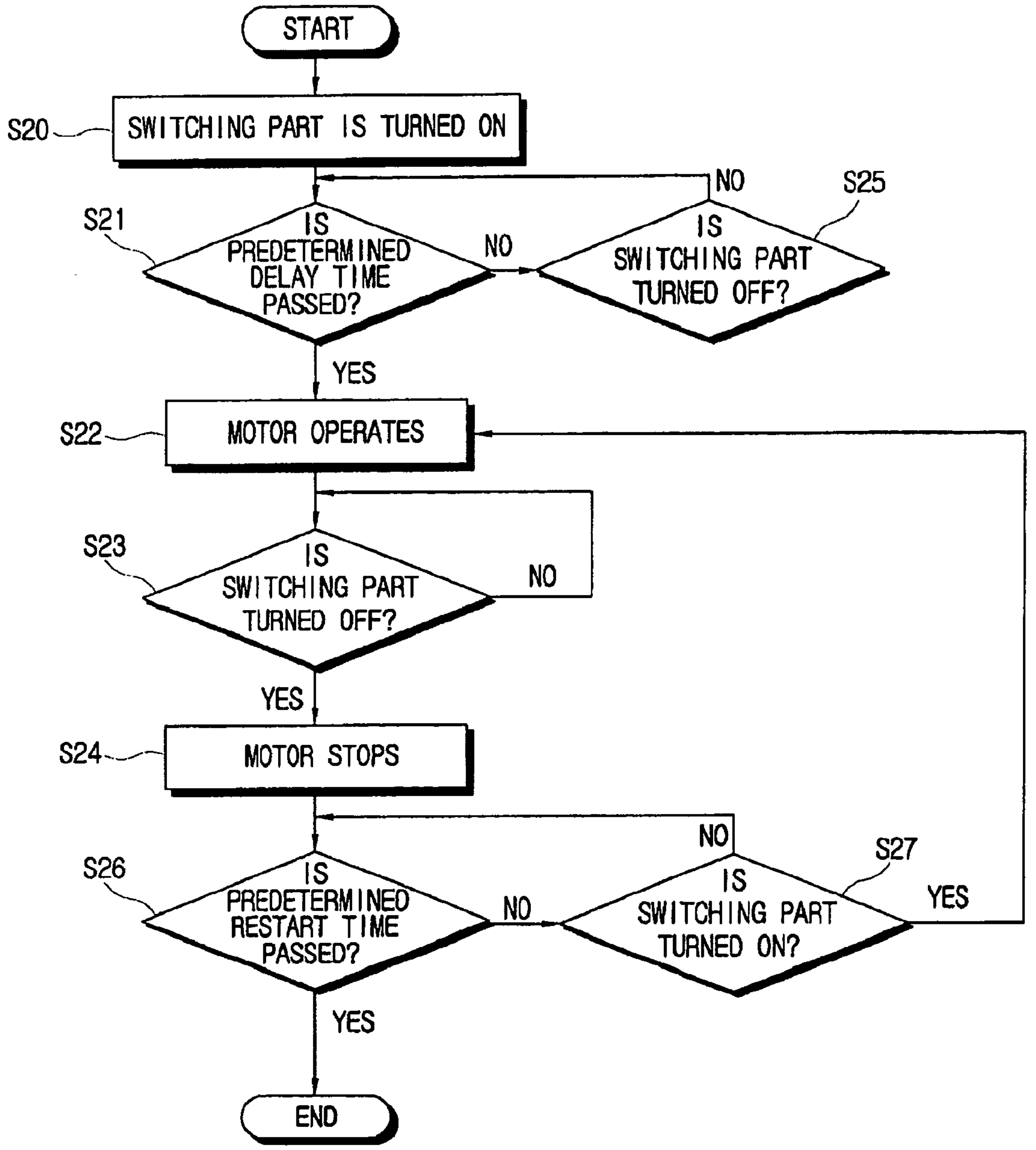
FIG. 5 is a control flow chart of the dispenser according to another embodiment of the present invention.
Figure 6A:
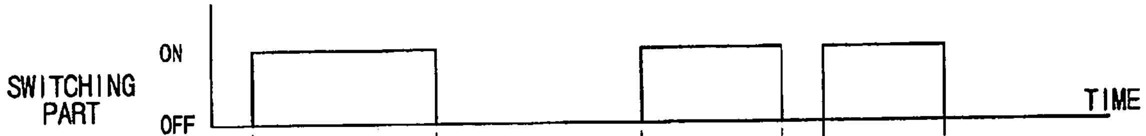
FIGS. 6A–6C are graphs showing on/off signals of a switching part, a driving part and a discharging cover according to an embodiment of the present invention.
Figure 6B:
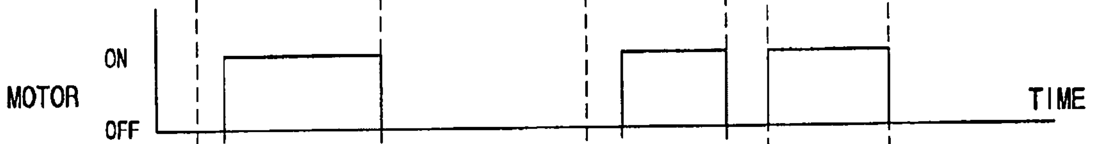
Figure 6C:
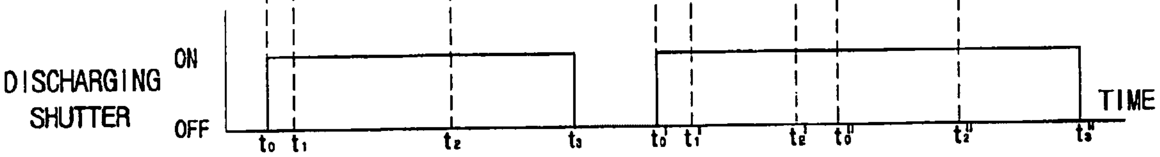

FIG. 3 is a control block diagram of the dispenser according to an embodiment of the present invention. As shown therein, the dispenser comprises a driving part, e.g., a motor 30 employed for discharging objects such as ice, a switching part 20 to be turned on/off by the discharging lever 4 so as to operate the motor 30, and a controller 10, sensing the on or off state of the switching part 20, to control the motor 30, causing it to operate or stop. Further, the dispenser includes a discharging shutter (not shown) provided in the freezing compartment door 3 to expose and cover a discharging hole (not shown) through which the ice is discharged, and a solenoid valve 40 to release the discharging shutter from the opened state so as to cover the discharging hole.

The operation of the motor 30 is controlled by the controller 10, so that the ice stored in the freezing compartment is moved toward the discharging hole provided in the freezing compartment door 3. In this embodiment, the motor 30 is employed as the driving part. However, various driving parts, such as a reciprocating piston, may be employed for moving the ice toward the discharging hole.

The switching part 20 is turned on when the discharging lever 4 is pushed backwardly in the dispensing part 5 by a user until rotated beyond a predetermined angle, and is turned off when the discharging lever 4 is returned to an original position.

The controller 10 causes the motor 30 to operate after a lapse of a predetermined delay time, once it is sensed that the switching part 20 is turned on as the discharging lever 4 is backwardly rotated. Further, the controller 10 causes the motor 30 to stop as soon as it is sensed that the switching part 20 is turned off as the discharging lever 4 is forwardly rotated.

The discharging shutter is physically opened, being interlocked with the rotation of the discharging lever 4. Further, the controller 10 controls the solenoid valve 40 to be operated so as to make the discharging shutter cover the discharging hole after a lapse of a predetermined operating time after the switching part 20 is turned off.

The controller 10 includes a motor relay 14 to operate the motor 30 after the lapse of the delay time after the switching part 20 is turned on, a valve relay 16 to operate the solenoid valve 40 after the lapse of the operating time after the switching part 20 is turned off, and a microprocessor 12 to sense the on or off state of the switching part 20 and control the motor relay 14 and the valve relay 16 according to the sensed on/off state of the switching part 20. The microprocessor 12 turns on the motor relay 14 after the lapse of the delay time after it is sensed that the switching part 20 is turned on, thereby operating the motor 30. Further, the microprocessor 12 turns on the valve relay 16 after the lapse of the operating time after it is sensed that the switching part 20 is turned off, thereby operating the solenoid valve 40 to make the discharging shutter cover the discharging hole. Here, if the switching part 20 alternates between the on state and the off state, the microprocessor 12 determines the lapse of the delay time after the switching part 20 is lastly turned off, thereby operating the solenoid valve 40.

While the discharging lever 4 is backwardly rotated in the dispensing part 5, the discharging lever 4 first turns on the switching part 20, and then opens the discharging shutter. For example, a rotary angle of when the discharging lever 4 is rotated to turn on the switching part 20 is smaller than the rotary angle of when the discharging lever 4 is rotated to open the discharging shutter, so that the switching part 20 is first turned on, and then the discharging shutter is opened. Thus, the discharging shutter is not opened before turning on the switching part 20.

With this configuration, operation of the dispenser according to an embodiment of the present invention will be described with reference to FIGS. 4 and 6A–6C.

First, a user pushes the container into the dispensing part 5 so as to receive the objects discharged from the discharging hole, with the container pushing and rotating the discharging lever 4 provided in the dispensing part 5. At operation S10, as the discharging lever 4 is backwardly rotated, the switching part 20 is first turned on ($t_0$), and then the discharging shutter exposes the discharging hole. At an operation S11, the microprocessor 12 determines whether or not the delay time ($t_0$~$t_1$) has passed since the switching part 20 was turned on. When the delay time ($t_0$~$t_1$) passes, at operation S12, the motor relay 14 is turned on to operate the motor 30 ($t_1$), thereby discharging the ice through the discharging hole.

Thereafter, a user pulls the container from the dispensing part 5, with the discharging lever 4 being forwardly rotated, so that, at operation S13, the switching part 20 is turned off ($t_2$). At operation S14, the moment it is sensed that the switching part 20 is turned off, the microprocessor 12 causes the motor 30 to stop ($t_2$). Then, the microprocessor 12 controls the valve relay 16 to operate the solenoid valve 40 after the lapse of the operating time ($t_2$~$t_3$) since the switching part 20 was turned off, thereby making the discharging shutter cover the discharging hole ($t_3$).

At operation S15, when the microprocessor 12 senses that the switching part 20 is turned off before the delay time ($t_0$~$t_1$) passes after it is sensed that the switching part 20 is turned on, the microprocessor 12 does not operate the motor 30.

On the other hand, in the dispenser according to another embodiment of the present invention, the controller 10 causes the driving part to operate the moment it is sensed that the switching part 20 is turned on again, before a predetermined restart time passes after it is sensed that the switching part 20 is turned off. Here, the restart time is shorter than the operating time.

With this configuration, operation of the dispenser according to this other embodiment of the present invention will be described with reference to FIGS. 5 and 6A–6C.

Like the previous embodiment, at operation S20, the switching part 20 is first turned on ($t_o$'). At operation S21, the microprocessor 12 determines whether or not the delay time ($t_0$'~$t_1$') has passed since the switching part 20 was turned on. When the delay time ($t_0$'~$t_1$') has passed, at operation S22, the motor relay 14 is turned on to operate the motor 30 ($t_1$'). Here, at operation S25, when the microprocessor 12 senses that the switching part 20 is turned off before the delay time ($t_0$'~$t_1$') has passed after it is sensed that the switching part 20 was turned on, the microprocessor 12 does not operate the motor 30.

Thereafter, at operation S23, the microprocessor 12 senses when the switching part 20 is turned off ($t_2$'). At operation S24, the microprocessor 12 causes the motor 30 to stop the moment the switching part 20 is turned off ($t_2$'). At operation S26, the microprocessor 12 determines whether or not the restart time has passed since it was sensed that the switching part 20 was turned off. At operation S27, when the microprocessor 12 senses that the switching part 20 is turned on ($t_0$") before the restart time has passed after it was sensed that the switching part 20 was turned off, at operation S22 the microprocessor 12 operates the motor 30 the moment it is sensed that the switching part 20 is turned on ($t_0$"). At this time, the solenoid valve 40 is operated when the restart time ($t_2$"~$t_3$") passes after the switching part 20 is turned off again, and shuts the discharging shutter ($t_3$"), so that the discharging shutter is being opened after the switching part 20 is turned on again. Therefore, whenever the switching part 20 is repeatedly turned on in the state that the discharging shutter is open, the motor 30 is immediately operated without a time lag. Then, the microprocessor 12 determines whether the operating time ($t_2$"~$t_3$") has passed after it is sensed that the switching part 20, which was turned on again, is turned off ($t_2$"), and controls the solenoid valve 40 to operate after the lapse of the operating time ($t_2$"~$t_3$"), thereby making the discharging shutter cover the discharging hole ($t_3$").

In the foregoing embodiment, the dispenser is used in the refrigerator. However, the principles and spirit of the invention are not limited to the refrigerator. For example, the dispenser could be used in a vending machine.

As described above, there is provided a controller 10 causing the motor 30 to operate after the lapse of the predetermined delay time after it is sensed that the switching part 20 is turned on, so that discharging objects are prevented from being stuck in the discharging hole, and frost is prevented from being deposited around the discharging hole, thereby smoothly discharging the objects.

Also, as described above, the present invention provides a dispenser and a control method thereof, and a refrigerator using the same, which can prevent discharging objects from being stuck in a discharging hole, and prevent frost from being deposited around the discharging hole, so as to smoothly discharge the discharging objects.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a dispenser having a driving part discharging objects, a switching part controlling the driving part to operate and stop, a discharging lever turning the switching part on/off, and a discharging shutter opening a discharging hole through which the objects are discharged, wherein the opening of the discharging shutter is coupled with the operation of the discharging lever turning on the switching part, comprising:

sensing whether the switching part is turned on or off; and controlling the driving part to operate after a lapse of a predetermined delay time since the switching part is turned on.

2. The method according to claim 1, wherein:

the dispenser has a solenoid valve releasing the discharging shutter from an opened state so as to make the discharging shutter cover the discharging hole; and the method further comprises opening the discharging hole when the discharging lever turns on the switching part, and closing the discharging hole by the solenoid valve after a lapse of a predetermined operating time since the switching part is turned off.

3. The method according to claim 2, further comprising controlling the driving part to not operate in response to the switching part being turned off before the lapse of the predetermined delay time.

4. The method according to claim 2, further comprising controlling the driving part to stop as soon as the switching part is turned off.

5. The method according to claim 4, wherein the lapse of the predetermined operating time is determined after a last turning off of the switching part, in response to the switching part being turned on again during the predetermined operating time.

6. The method according to claim 4, further comprising controlling the driving part to operate as soon as the switching part is turned on again before a predetermined restart time passes since the switching part is turned off.

7. The method according to claim 6, wherein the predetermined restart time is shorter than the predetermined operating time.

8. A dispenser to discharge objects, comprising:

a driving part discharging the objects;

a switching part;

a discharging lever turning the switching part on/off;

a discharging shutter opening a discharging hole through which the objects are discharged, wherein the opening of the discharging shutter is coupled with the operation of the discharging lever turning on the switching part; and a controller controlling the driving part to operate after a lapse of a predetermined delay time since the switching part is turned on.

9. The dispenser according to claim 8, wherein the switching part is turned on when the discharging lever is moved from an original position, and turned off when the discharging lever begins moving back to the original position.

10. The dispenser according to claim 9, wherein the switching part is turned on at an earlier part of the movement of the discharging lever, and the discharging shutter is opened at a later part of the movement of the discharging lever.

11. The dispenser according to claim 8, further comprising a solenoid valve releasing the discharging shutter from an opened state so as to make the discharging shutter cover the discharging hole.

12. The dispenser according to claim 11, wherein the controller controls the driving part not to operate in response to the switching part being turned off before the lapse of the predetermined delay time.

13. The dispenser according to claim 11, wherein the driving part is a reciprocating piston.

14. The dispenser according to claim 11, wherein the controller controls the driving part to stop as soon as the switching part is turned off.

15. The dispenser according to claim 14, wherein the driving part is a motor.

16. The dispenser according to claim 15, wherein the controller further comprises:

a motor relay operating the motor after the predetermined delay time;

a valve relay operating the solenoid valve; and a microprocessor controlling the motor relay and valve relay, and determining when the switching part is turned on/off.

17. The dispenser according to claim 14, wherein the controller controls the solenoid valve to release the discharging shutter from the opened state after a lapse of a predetermined operating time since the switching part is turned off.

18. The dispenser according to claim 17, wherein the controller determines the lapse of the predetermined operating time after a last turning off of the switching part, in response to the switching part being turned on again during the predetermined operating time.

19. The dispenser according to claim 17, wherein the controller controls the driving part to operate as soon as the switching part is turned on again before a predetermined restart time passes since the switching part is turned off.

20. The dispenser according to claim 19, wherein the predetermined restart time is shorter than the predetermined operating time.

21. A refrigerator comprising:

a main cabinet comprising at least one storage compartment having a front opening;

a door opening and closing the front opening of the storage compartment; and a dispenser to discharge objects, the dispenser comprising:

a driving part discharging objects, a switching part, a discharging lever turning the switching part on/off, a discharging shutter opening a discharging hole through which the objects are discharged, wherein the opening of the discharging shutter is coupled with the operation of the discharging lever turning on the switching part, and a controller controlling the driving part to operate after a lapse of a predetermined delay time since the switching part is turned on.

22. The refrigerator according to claim 21, further comprising a solenoid valve releasing the discharging shutter from an opened state so as to make the discharging shutter cover the discharging hole.

23. The refrigerator according to claim 21, wherein the controller controls the driving part to stop as soon as the switching part is turned off.

* * * * *